Figure 1:
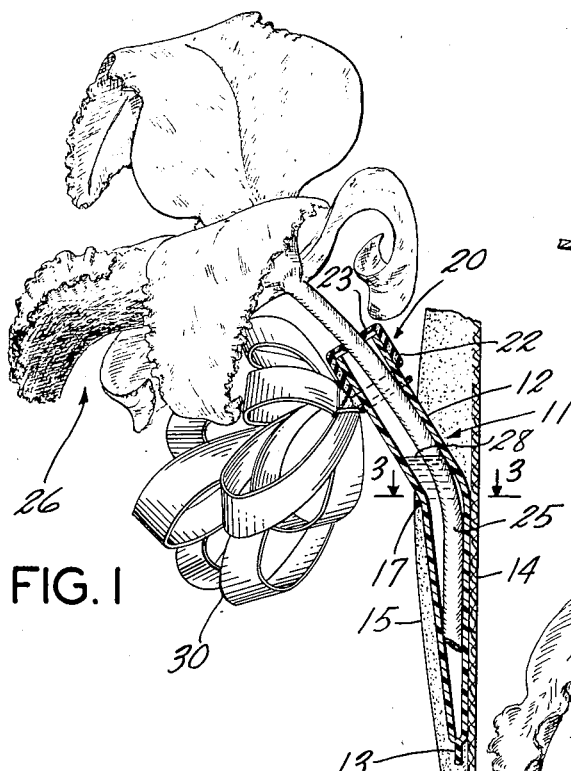

July 31, 1956    J. MOSSMAN    2,756,542
CORSAGE WITH ANGULAR FLOWER HOLDER
Filed April 18, 1952

INVENTOR.
John Mossman
BY Emery, Varney,
Whittemore & Dix.
ATTORNEYS.

United States Patent Office 2,756,542
Patented July 31, 1956

2,756,542

CORSAGE WITH ANGULAR FLOWER HOLDER

John Mossman, Tappan, N. Y.

Application April 18, 1952, Serial No. 282,926

1 Claim. (Cl. 47—41)

This invention relates to holders for flowers, particularly orchids, in corsages.

It has been a usual practice to use tubes of water in orchid corsages with the stem of the orchid in the tube and projecting through a rubber cap at the top of the tube. In order to display the flower to better advantage, and to prevent it from being damaged by rubbing against the dress of the person wearing the corsage, the stem of the orchid above the tube has been bent outwardly so as to space the flower from the dress to which the corsage is attached.

The necessary curve of the orchid stem has been obtained by piercing the back of the flower with a wire and then wrapping convolutions of the wire around the stem of the flower. A ribbon, usually of orchid color, is then wrapped around the stem and over the wire to hide the wire and the upper portion of the tube, and to secure the wire to the tube. With the stem so wrapped, it can be bent to any desired curve and will be held to that curve by the stiffness of the wire.

It is an object of this invention to provide an improved corsage construction which makes it unnecessary to pierce the flower, or to wrap wire around the flower stem, or to use a camouflaging wrapping around the stem to cover up the unsightly wire bracing of the prior art. In accordance with one feature of the invention, the stem of the orchid is inserted into a tube which has its upper portion bent forwardly so as to give the orchid stem the necessary arch to locate the flower away from the wearer's dress and at an angle which displays the flower to best advantage.

Another object of the invention is to provide a holder for an orchid corsage which prevents the corsage from turning to either side and which maintains it with the flower extending straight forward in the same way in which the corsage was originally attached to the dress. Orchid corsages are generally attached to a dress by pressing them against the dress so as to form a fold and then inserting a pin through the gathers of the material that form on both sides of the corsage. This is a graceful and decorative way of securing the corsage to the dress, but with a corsage that has any substantial portion extending outwardly for some distance from the dress, the tube will sometimes turn about its longitudinal axis and permit one side or the other of the flower to come against the dress instead of remaining in the original outwardly extending position to which it was adjusted.

In accordance with another feature of this invention, the holder in which the stem of the orchid is held is flattened, or made wider at its lower end, so that it is no longer symmetrical about its longitudinal axis and will not rotate. This transverse widening of a non-circular lower end of the holder cooperates with the forwardly bent upper portion of the invention to prevent turning of a corsage which is made heavier at the front by the forward extent of the tube.

The invention thus obtains the advantage of placing the flower away from the wearer's dress without resorting to wire bracing and wrapping of the stem, and at the same time eliminates the hazard of an unstable location of the flower by providing a broadened bottom for the tube which prevents the corsage from turning.

The stem holder of this invention is preferably made of plastic material of orchid color so that the tube forms an inconspicuous and decorative part of the corsage and it is no longer necessary to hide it by wrapping it with ribbon.

The invention gives the stem of the orchid a gentle curve when the stem is pushed into it and there is no danger of damaging the capillaries of the stem by bending it too sharply as sometimes occurs when adjusting the wire-wrapped stems. Another advantage of the invention is that all parts of the corsage except the orchid can be assembled before the flowers are cut and the final step of inserting the flower can be done quickly just before shipping the corsage. With this invention orchid growers can make and ship large numbers of corsages without having the first ones stand around for several days while the full order is completed. This is significant because of the fact that corsages are in heavy demand on particular days, such as Mother's Day and Easter, and in order to provide fresh corsages, they must all be made up within a few days before the day on which they are to be used.

Other objects, features and advantages of the invention will appear or be pointed out as the specification proceeds.

Figure 4:
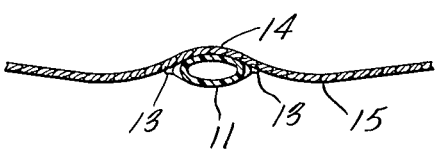
Figure 2:
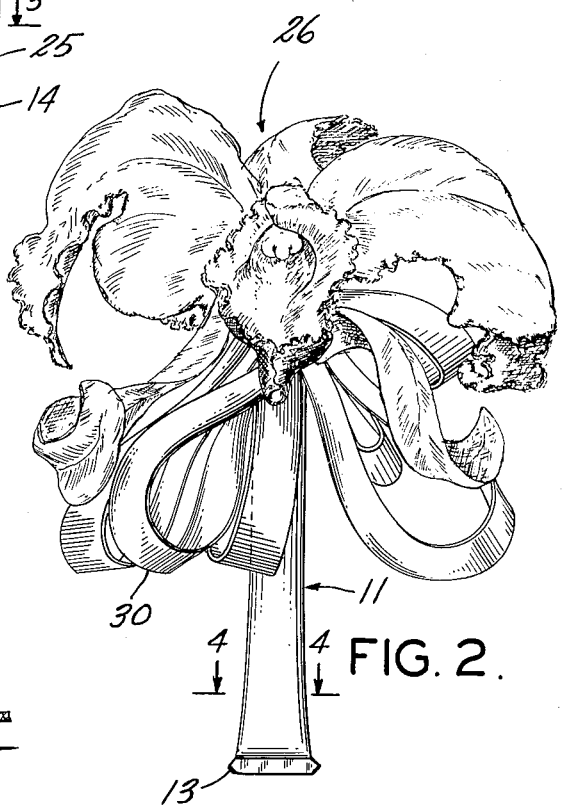
Figure 3:
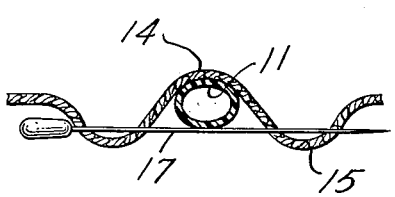

In the drawing forming a part hereof, in which like reference characters indicate corresponding parts in all the views, Fig. 1 is a vertical sectional view through an orchid corsage embodying this invention and attached to a dress in the conventional manner, Fig. 2 is a front view of the corsage shown in Fig. 1, Figs. 3 and 4 are horizontal sectional views taken on the lines 3—3 and 4—4, respectively, of Figs. 1 and 2.

The orchid corsage includes a plastic tube 11 having an upper portion 12 which curves forwardly with respect to the longitudinal axis of the lower portion of the tube. The bend is preferably between 20 and 60 degrees.

At its lower end, tube 11 has a flattened portion 13 which closes the bottom of the tube and provides a watertight seam. This flattened portion 13 increases the width of the tube at its lower end, as is clearly shown in Figs. 2 and 4, and the sides of the tube above the flattened portion 13 merge with fair form to the substantially circular cross section of the upper and mid-portions of the tube, the transverse width of the tube becoming progressively less as the forward and rearward dimension of the tube increases toward the section of circular or substantially circular contour. The bend in the tube usually causes a slight flattening of the circular section to an ellipse immediately below the bend.

Referring to Figs. 1, 3 and 4, the back of the tube 11 is pressed against a dress 14 to which the corsage is to be attached. Pressing the tube rearwardly permits the dress to form folds or gathers 15 on opposite sides of the tube, and a long pin 17 is inserted through these folds and across the front of the tube to hold the corsage against the dress.

The circular or slightly flattened tube can be rotated easily about its longitudinal axis when held in position by a pin in the manner illustrated in Fig. 3. With the non-circular lower portion of the tube 11, however, the corsage cannot be turned about the axis of the tube.

The tube has a cap 20 with a skirt 22 that extends downwardly around the outside of the cylindrical upper end of the tube. This skirt 22 is stretched slightly when the cap is placed on the tube so as to maintain pressure and sufficient friction to hold the cap in place. The cap is preferably made of gum rubber, and this material has a substantial friction with the plastic surface of the tube. One of the disadvantages of glass tubes, used in the prior art, has been that the cap had to be stretched quite tightly to obtain sufficient friction against the smooth glass, and this made the assembly of the cap and tube more difficult and more expensive.

The cap 20 has a top 23 which extends across the open end of tube 11. There is a hole in the top 23 through which a stem 25 of an orchid 26 extends into the tube. The unstretched diameter of this holder in the top is slightly less than the diameter of the orchid stem with which it is intended to be used. Thus, when the stem is inserted through the top, the rubber is stretched slightly and the top is dished so as to grip the stem firmly to hold it in the tube.

It is not desirable to grip the orchid stem too tightly because this will close the capillaries in the stem and prevent the flower from receiving ample moisture from the water within the tube. One refinement of the invention comprises a cap 20 which has a skirt 22 of thicker rubber than the top 23. This permits the cap to grip the tube with more force than it grips the flower and it is of particular significance with plastic tubes which have sufficient friction to hold the cap 20 in place without resorting to special stretchers for fitting an undersized cap over the end of the tube or the use of tubes with a bead around the mouth, or the wrapping of a tight wire around the outside of the skirt to hold the cap on a slippery glass surface.

The stem 25 is inserted through the top 23 while the stem is wet. This causes it to slip easily through the rubber cap, and it is pushed through the cap far enough to locate the bottom of the stem at least one-half way down in the tube 11 and below the level of the water 28 or in liquid solution that may be used in the tube to keep the flower fresh.

The cap 20 comprises means for holding the stem in the tube 11. Other means can be employed such as packing in the tube around the stem. Moist absorbent cotton can be packed around the stem in the tube instead of using the cap 20. If the corsage is not subjected to warm temperatures which evaporate the moisture from the cotton, this provides an effective and satisfactory means for holding the stem in the tube and keeping the flower fresh.

The corsage also includes an ornamental bow 30 of ribbon, usually of orchid color and made with a multiplicity of loops which give the corsage a fluffy and attractive appearance. With the forwardly bent tube of this invention, the blossom of the orchid projects forward at such an angle that the lower portion of the blossom is below the upper limits of the bow 30, and the blossom and bow combine to hide the cap 20 when the corsage is viewed from the front. With an orchid colored tube 28 and a relatively short skirt 22, which is made practical by the substantial friction of the tube, the cap 20 is not sufficiently prominent to detract from the appearance of the corsage when glimpsed occasionally in side views of the corsage. Materials which have been found particularly suitable for the plastic tube include Hyluscel.

The preferred embodiment of the invention has been illustrated and described, but changes and modifications can be made without departing from the invention as defined in the claim.

What is claimed is:

In an orchid holder, a water tube having a cylindrical upper portion and a lower portion of progressively flatter cross section toward its lower end, and a resilient and stretchable cap fitting snugly over the upper end of the tube, the cap having a cylindrical skirt that firmly grips the outside surface of the tube, and an end wall of the cap of substantially the same diameter as the skirt and with an opening for receiving the stem of an orchid blossom, said opening having a circumferential edge for firmly gripping the circular surface of the orchid stem, the longitudinal axis of said opening extending at an angle to at least a portion of the length of the tube for holding the stem of the orchid bent forwardly to prevent rotation of the circular stem in the holder, the tube being of a fore-and-aft inside dimension less than the diameter of the orchid stem for a substantial distance above the lower end of the inside of the tube to leave a water space in the tube below the orchid stem and the tube being progressively wider and flatter from its cylindrical upper portion to its lower end and of maximum width at its lower end in a direction substantially normal to the plane in which the holder bends the orchid stem forward whereby the lower end of the tube, pressed flat against a dress, prevents rotation of the holder with respect to the dress on which the orchid holder is worn.

References Cited in the file of this patent

UNITED STATES PATENTS

| 331,614 | Cardell | Dec. 1, 1885 |
| 1,732,213 | Alland | Oct. 22, 1929 |
| 1,851,205 | Nagai | Mar. 29, 1932 |

FOREIGN PATENTS

| 758,427 | France | Nov. 3, 1933 |
| 17,135 | Great Britain | 1907 |

OTHER REFERENCES

Publication: The Florist Telegraph News, vol. 36, No. 36, July 1838, pp. 8 and 9.